United States Patent [19]

Goldman et al.

[11] Patent Number: 5,715,425
[45] Date of Patent: Feb. 3, 1998

[54] APPARATUS AND METHOD FOR PREFETCHING DATA INTO AN EXTERNAL CACHE

[75] Inventors: Gary S. Goldman, San Jose; Bruce E. Petrick, Sunnyvale; Marc Tremblay, Palo Alto; Dale R. Greenley, Los Gatos, all of Calif.

[73] Assignee: Sun Microsystems, Inc., Mountain View, Calif.

[21] Appl. No.: 603,909

[22] Filed: Feb. 22, 1996

[51] Int. Cl.⁶ .................................................. G06F 12/00
[52] U.S. Cl. .................. 395/445; 395/421.03; 395/403; 364/DIG. 1
[58] Field of Search ......................... 395/800, 389, 395/403, 381, 585, 421.03

[56] References Cited

U.S. PATENT DOCUMENTS

| | | | |
|---|---|---|---|
| 4,583,165 | 4/1986 | Rosenfeld | 395/421.03 |
| 4,926,323 | 5/1990 | Baror et al. | 395/585 |
| 5,155,816 | 10/1992 | Kohn | 395/381 |
| 5,438,670 | 8/1995 | Baror et al. | 395/403 |
| 5,481,751 | 1/1996 | Alpert et al. | 395/389 |
| 5,539,911 | 7/1996 | Nguyen et al. | 395/800 |

OTHER PUBLICATIONS

Kurpanek, et al, "PA7200: A PA-RISC Processor With Integrated High Performance MP Bus Interface", Spring COMPCON '94, IEEE Computer Society Press, pp. 375–382.
"PA–8000 Combines Complexity and Speed", Microprocessor Report, vol. 8, No. 15, Nov. 14, 1994.
MIPS R10000 Microprocessor User's Manual, Section 1.7, MIPS Technologies, Inc., Jan., 1996.

Primary Examiner—Tod R. Swann
Assistant Examiner—David Langjahr
Attorney, Agent, or Firm—Flehr Hohbach Test Albritton & Herbert LLP; William S. Galliani

[57] ABSTRACT

A central processing unit is connected to an external memory including system memory and an external cache. The central processing unit includes a First-In-First-Out (FIFO) load buffer configured to generate an access to the external memory in response to a data prefetch command. The access to external memory has an associated data load latency period as data is moved from the system memory into the external cache. Instead of requiring the access to external memory to be completed before another FIFO load buffer address is processed, as is typically required in a FIFO load buffer configuration, the FIFO load buffer responds to the data prefetch command by processing additional stored addresses during the data load latency period.

13 Claims, 3 Drawing Sheets

APPARATUS AND METHOD FOR PREFETCHING DATA INTO AN EXTERNAL CACHE

BRIEF DESCRIPTION OF THE INVENTION

This invention relates generally to computer systems optimized for high data throughput applications, such as floating-point data processing applications. More particularly, this invention relates to a computer system with a First-In-First-Out (FIFO) address load buffer that accommodates the prefetching of data into an external cache to improve processing in high data throughput applications.

BACKGROUND OF THE INVENTION

The performance of a Central Processing Unit (CPU) of a computer is sometimes limited when it does not receive data as fast as calculations can be made. In other words, the CPU stalls when it is waiting for data to be delivered from memory. Data throughput problems of this type commonly arise in relation to floating-point data. Floating-point data is typically associated with scientific calculations that involve large arrays of floating-point numbers. A floating point number is a number whose value is represented by two sets of digits: a fixed-point part and a base number with an associated exponent. To add two floating-point numbers, their exponents are equalized by shifting the mantissa of the smaller expression until it corresponds to the difference in exponent values. For example, before adding $0.5 \times 10^3$ to $0.4 \times 10^7$, $0.5 \times 10^3$ is written as $0.0005 \times 10^7$. The numbers are then added to yield $0.4005 \times 10^7$. The CPU of a computer includes a floating-point execution unit to perform calculations of this type.

For many floating-point intensive applications, the main performance bottleneck is providing enough data to keep the CPU's floating-point execution units busy. Ideally, the required floating-point data is available in the CPU cache, a memory structure storing recently accessed data.

Today, most CPUs utilize multi-level caches. A first level cache (L1) is an internal cache formed on-board the CPU. The internal cache is relatively small, but operates at a high speed. A second level cache (L2) is an external cache positioned outside of the CPU. The external cache is relatively large, but is not as fast as the internal cache.

When required data does not exist in the internal cache or external cache, a "cache miss" is said to exist. When a cache miss exists, data must be fetched from system memory. Cache misses are problematic because the amount of data that can be processed is limited to the speed at which data can be fetched from system memory. Typically, the system memory includes Random Access Memory (RAM) and disc storage. Retrieving required data from RAM is relatively time consuming (tens of clock cycles) and thereby results in compromised performance. Retrieving required data from disc storage is especially time consuming (hundreds of clock cycles) and thereby results in substantial performance penalties.

The floating-point execution unit of a CPU cannot operate efficiently if it is retrieving data from system memory. In other words, the floating-point execution unit is only efficient when it is receiving all of its data from the internal or external cache. For floating-point intensive operations, the internal cache is too small to maintain desired floating-point execution rates. Consequently, most of the retrieved data is obtained from the external cache. Thus, in such applications it is critical to successfully exploit the external cache.

Information from an external cache may be retrieved with the use of an address load buffer (referred to herein as a load buffer). That is, if the data associated with a specified address is not found in the internal cache, then the specified address is loaded into a load buffer. The specified address is passed through the load buffer and is then used to access the external cache. If the specified address does not exist in the external cache, then a cache miss exists and the data associated with the specified address must be retrieved from system memory.

Load buffers may be implemented in different ways. The simplest implementation is a First-In-First-Out (FIFO) configuration. As its name implies, with a FIFO load buffer, the first address request (from the internal cache) in the buffer is the first address request out of the buffer (to the external cache). The problem with FIFO load buffers is that if an address request at the front of the load buffer does not exist in external cache (a cache miss), the address must be retrieved from system memory. This position at the front of the load buffer cannot be retired until the data is fetched and loaded into the internal cache or into an internal register. Meanwhile, all other address requests behind the first address request are blocked because of the cache miss. This is the case even if the subsequent addresses in the FIFO exist in the external cache and could therefore be rapidly processed.

To eliminate the problems associated with FIFO load buffers, complex out-of-order cache controllers and instruction issuing units may be used. These devices rely upon complicated strategies for issuing load requests out of order. In such devices, it is feasible to employ data prefetching. Compiler-directed data prefetching is a technique wherein a block of data is brought into the cache before it is actually referenced. The compiler identifies data blocks needed in the future. Special instructions are then created to move the data blocks into the cache. When the block is actually referenced at a subsequent time, it is available in the cache, rather than causing a cache miss. Examples of microprocessors of this type are described in the following publications: Kurpank, et al., "PA7200: A PA_RISC Processor with Integrated High Performance MP Bus Interface", Spring COMPCON '94, IEEE Computer Society Press, pp. 375–382; "PA-8000 Combines Complexity and Speed", *Microprocessor Report*, Vol. 8, Number 15, Nov. 14, 1994; and *MIPS R10000 Microprocessor User's Manual*, Section 1.7, MIPS Technologies, Inc., January 1996.

The problem with complex out-of-order cache controllers and instruction issuing units is that they require relatively large amounts of die space. In addition, their complexity results in design problems.

In view of the foregoing, it would be highly desirable to improve the processing associated with an external cache through a simple FIFO address load buffer operated in conjunction with a data prefetching scheme.

SUMMARY OF THE INVENTION

A central processing unit is connected to an external memory including system memory and an external cache. The central processing unit includes a First-In-First-Out (FIFO) load buffer configured to generate an access to the external memory in response to a data prefetch command. The access to external memory has an associated data load latency period as data is moved from the system memory into the external cache. Instead of requiring the access to external memory to be completed before another FIFO load buffer address is processed, as is typically required in a FIFO load buffer configuration, the FIFO load buffer responds to the data prefetch command by processing additional stored addresses during the data load latency period. In other words, an external cache miss caused by a prefetch command does not block subsequent external cache hits. Thus, subsequent external cache hits can be processed by the FIFO load buffer during the data load latency period.

The invention hides the memory latency associated with the loading of an external cache. By pre-loading data into the external cache, high external cache hit rates can be achieved in high data throughput applications, such as floating-point data processing. Advantageously, the invention preserves the utility of a simple FIFO load buffer structure. Thus, it is relatively easy to implement the invention with minimal die area.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
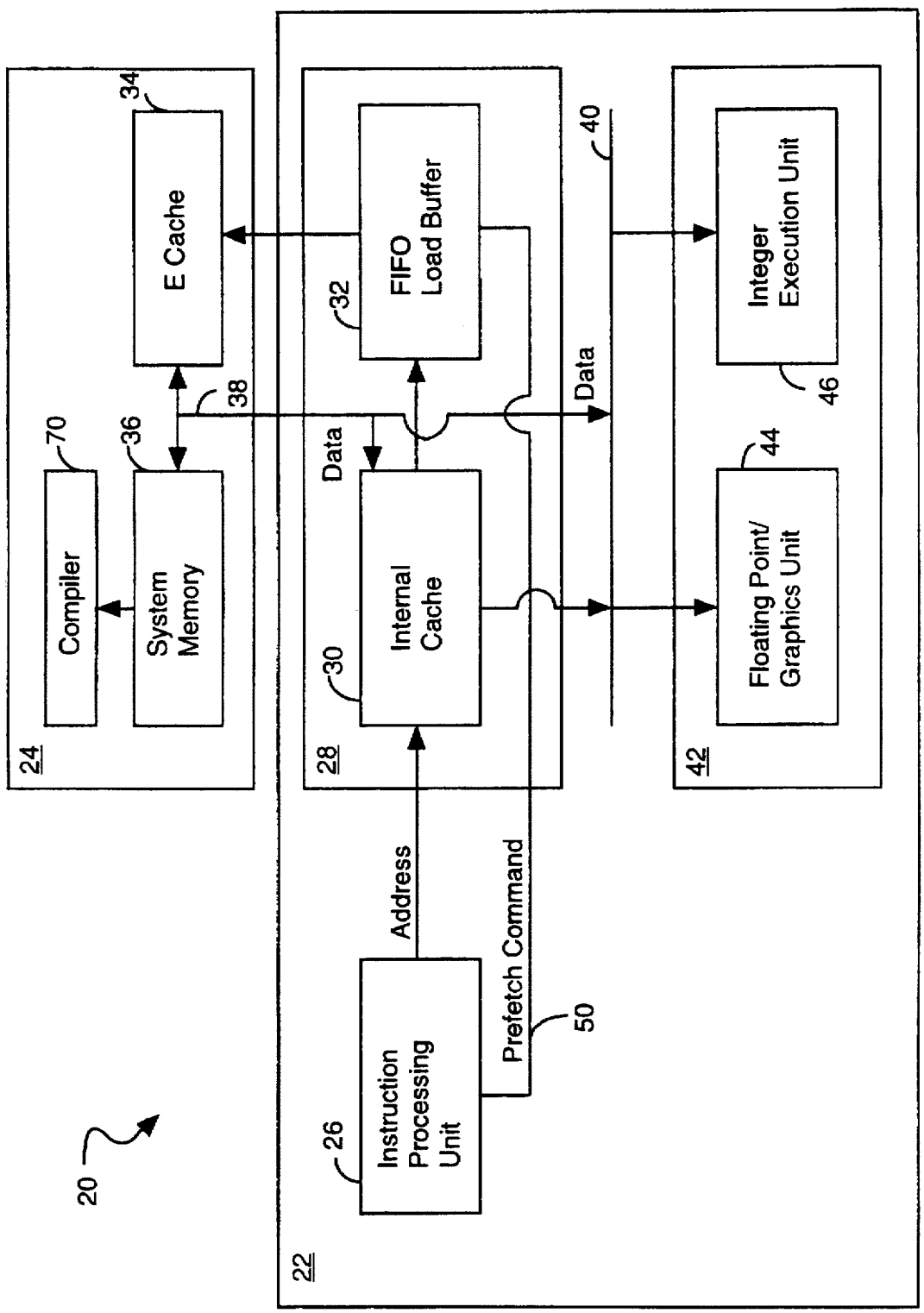
FIG. 1 illustrates a computer system incorporating one embodiment of the invention.

FIG. 1 illustrates a computer 20 formed in accordance with the invention. The computer 20 includes a central processing unit 22 connected to an external memory 24.

The central processing unit 22 includes an instruction processing unit 26, which receives computer program statements. It is important to note that the instruction processing unit 26 of the invention issues instructions in the order that they are received. In other words, out-of-order instruction processing is not associated with the architecture of the present invention. Consequently, a FIFO load buffer must be used.

Most computer program statements include an instruction and a memory address. The memory address is conveyed to a load/store unit 28. The load/store unit 28 includes an internal cache 30. The memory address from the instruction processing unit 26 is compared to stored memory addresses in the internal cache 30. If a match is found, the data corresponding to the memory address is routed to another portion of the computer 20, as will be discussed below. If a match is not found, then an internal cache miss signal is sent to a FIFO load buffer 32. This allows the internal cache 30 to immediately process another address for high processing throughput.

The FIFO load buffer 32 processes the internal cache miss signal by sending it to an external cache 34. The external cache 34 may already be processing previously dispatched pipelined addresses from the FIFO load buffer 32.

The CPU can execute instructions while addresses are in the queue of the FIFO load buffer 32. Thus, the FIFO load buffer 32 operates to improve the data throughput of the CPU 22.

The memory address associated with the internal cache miss signal is compared with memory addresses stored in the external cache. If a match is not found, an external cache miss exists and the address must be retrieved from the system memory 36, which typically includes RAM and magnetic or optical disc storage.

The data retrieved from system memory 36 is then delivered to a memory bus 38. That data is written to either the external cache 34 or the internal cache 30, while being delivered to a central processing unit bus 40. The central processing unit bus 40 routes the data and its corresponding instruction to an execution unit 42, where the information is processed. For the purposes of illustration, the execution unit 42 of FIG. 1 includes a floating point unit 44 and an integer execution unit 46. As indicated above, the invention is directed toward high data throughput applications, such as those particularly associated with a floating point unit 44 of a central processing unit 22.

It should be noted at this point that all other addresses in the FIFO load buffer 32 are blocked by the external cache miss and subsequent fetching of data from the system memory 36. That is, the subsequent addresses in the FIFO load buffer 32 can only be processed after the data is fetched and written into the internal cache 30, external cache 34, or another on-board register (not shown). After this data fetching and writing operation is performed, the internal cache miss signal is "retired" from the FIFO load buffer 32, meaning subsequent address in the FIFO load buffer 32 may be processed.

The present invention uses an instruction processing unit 26 to recognize a data prefetch command. That is, the instruction processing unit 26 is modified to recognize the bit pattern of a new instruction for data prefetching. When such an instruction is identified in a program statement, then a data prefetch command is directly routed to the FIFO load buffer 32 over line 50. The data prefetch command includes a memory address and an indicator that a prefetch instruction exists.

The data prefetch command proceeds through the FIFO load buffer 32 as any other internal cache miss signal. When the internal prefetch command is at the front of the load buffer, it is applied to the external cache 34. However, instead of blocking subsequent instructions in the FIFO load buffer 32, the data prefetch command is treated as being retired as soon as it is released to the external cache 34. In other words, unlike the case of an internal cache miss signal where the memory latency associated with loading data into the cache causes subsequent addresses in the FIFO load buffer from being processed, the data prefetch command immediately releases the FIFO load buffer for the processing of additional addresses.

If the address associated with the data prefetch command already exists in the external cache 34, then no further action is taken. If the address does not exist in the external cache 34, then it is retrieved from system memory 36. However, in this case, the operation is transparent to the FIFO load buffer 32 in the sense that the FIFO load buffer is not waiting for the data to be retrieved before additional processing commences. In this way, the invention hides the memory latency of loading data from the system memory 36 into the external cache 34.

When the prefetched data is required with a subsequent instruction, it is available in the external cache 34. Thus, the prefetching technique of the invention provides a high external cache hit rate, which is especially important in high data throughput applications. The invention realizes these benefits while preserving the simple FIFO load buffer 32. The traditional FIFO load buffer 32 needs to be modified to recognize a data prefetch command, and in response to it, retire the command when its corresponding address is launched to the external cache 34, instead of waiting for the loading of data from the external cache, as is the case with an internal cache miss signal. This functionality can be implemented in any number of ways. One implementation is described in reference to FIGS. 2 and 3.

Figure 2:
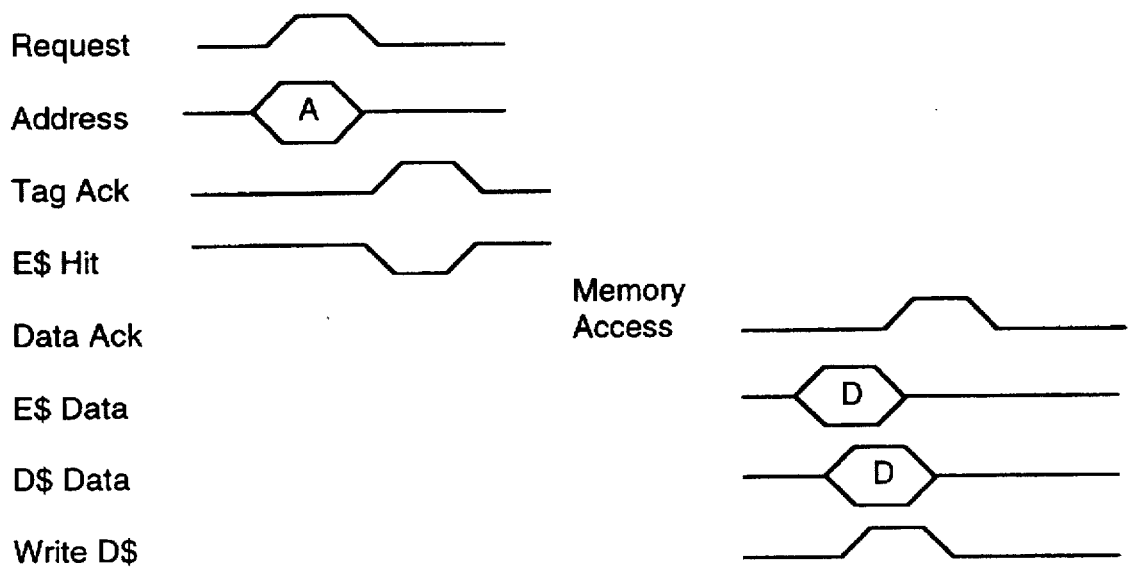
FIG. 2 illustrates the set of signals exchanged between the FIFO load buffer and external cache in response to a load address miss operation.

FIG. 2 illustrates a set of signals that are exchanged between a FIFO load buffer 32 and an external cache 34. It should be appreciated that the external cache 34 includes an external cache controller, which is not explicitly illustrated. The FIFO load buffer 32 generates a request signal followed by an address signal, as shown. The controller of the external cache 34 returns a tag acknowledgment signal and an external cache hit signal. The external cache hit signal of FIG. 2 indicates that a cache miss has occurred. Thus, a memory access is executed. The FIFO load buffer 32 uses the external cache miss signal to block the processing of subsequent addresses in the load buffer.

After the memory access, the controller of the external cache 34 produces a data acknowledgment signal. The memory access is also followed by the storing of data into the external cache (E$) 34 and internal cache (D$) 30, as shown. After the data is stored in the internal cache 30, it can be written to a designated location, as shown by the final waveform of FIG. 2.

Figure 3:
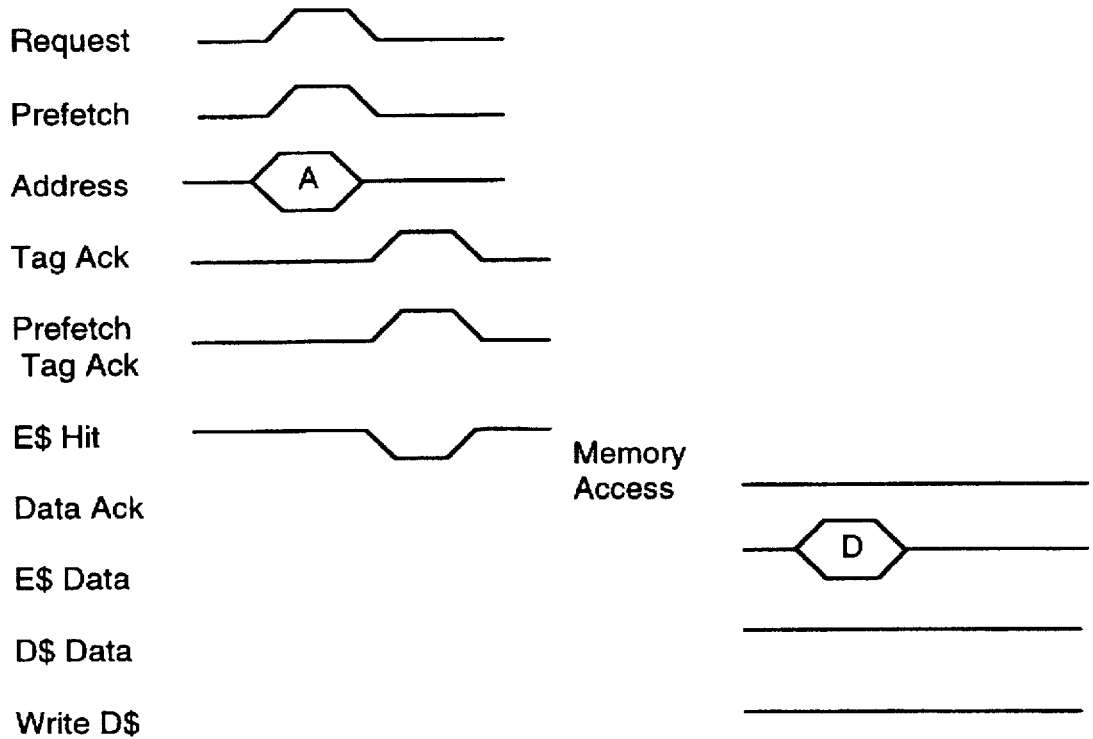
FIG. 3 illustrates the set of signals exchanged between the FIFO load buffer and external cache in response to a prefetch miss operation.

The operations performed between the FIFO load buffer 32 and the external cache 34 in response to a prefetch signal are shown in FIG. 3. Two additional signals are used for this operation: a prefetch signal and a prefetch tag acknowledgment.

FIG. 3 illustrates the same operations as those shown in FIG. 2, but with some noteworthy distinctions. First, it should be noted that the request signal is accompanied by a prefetch signal. That is, the FIFO load buffer 32 passes a prefetch signal to the controller of the external cache 34. Second, it should be noted that the tag acknowledgment signal is accompanied by a prefetch tag acknowledgment signal. The controller of the external cache 34 generates these signals. When the FIFO load buffer 32 receives the prefetch tag acknowledgment signal, it retires the prefetch command from the buffer, allowing other addresses to be processed. Thus, in the case of a prefetch operation, the operations performed after the memory access do not stall the FIFO load buffer 32. FIG. 3 illustrates the external cache receiving data, while the internal cache (D$ Data) 30 is unasserted.

Figure 4:
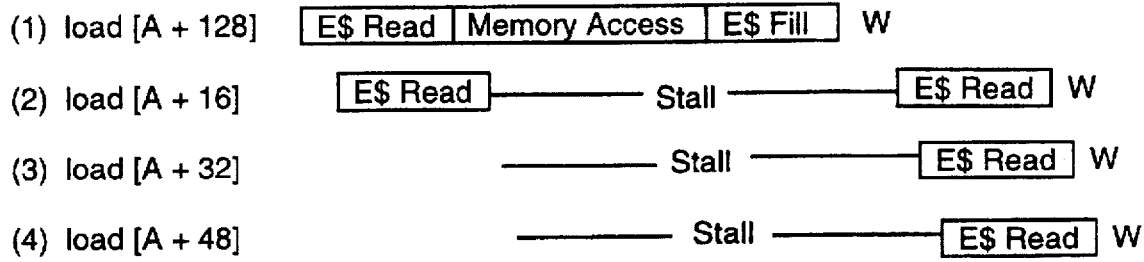
FIG. 4 illustrates the blocking effect in a FIFO load buffer caused by a cache miss.

The invention and its benefits have now been fully described. The invention may be more fully appreciated with reference to FIGS. 4-6. FIG. 4 graphically illustrates the problem of a blocking cache miss associated with FIFO load buffers of the prior art. FIG. 4 illustrates four load instructions processed by a computer. The instruction of line (1) is to load the value "A+128". Assume that this instruction causes a miss in the internal cache 30, resulting in an internal cache miss signal that is applied to the FIFO load buffer 32, which is then applied to the external cache 34. As shown to the right of the instruction, the external cache (E$) read results in an external cache miss that produces a memory access delay as the required information is retrieved from system memory 36. Ultimately, the information is retrieved and placed in the external cache (E$ fill). The data can then be written (symbolized by the "W") from the external cache to a designated location. Afterwards, the address is retired from the FIFO load buffer 32.

Instruction (2) of FIG. 4 results in a read from the external cache, but in this case the value is in the external cache, so an access to the system memory 36 is not necessary. Nevertheless, the second instruction is stalled, until the FIFO load buffer retires the address associated with instruction (1), as shown in the figure. Similar results are seen with instructions (3) and (4) of FIG. 4.

Figure 5:
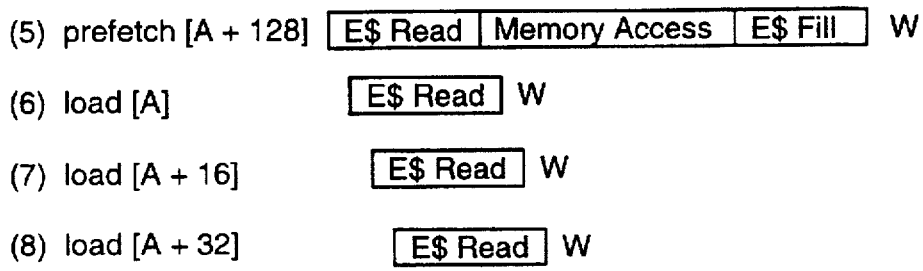
FIG. 5 illustrates the non-blocking effect of data prefetch misses associated with the invention.

FIG. 5 illustrates how a data prefetch operation in accordance with the invention avoids this problem. In particular, instruction (5) of FIG. 5 illustrates a prefetch command which results in an external cache 34 access (E$ read). This operation is followed by a memory access, and an external cache 34 fill. However, with the data prefetch operation, subsequent instructions are not blocked. That is, the data prefetch instruction is immediately retired from the FIFO load buffer, allowing the system memory access to be performed without disrupting the external cache 34 reads of instructions (6) through (8). That is, instructions (6) through (8) can read the specified memory address in the external cache and use the information while the prefetch operation is completing its task.

Figure 6:
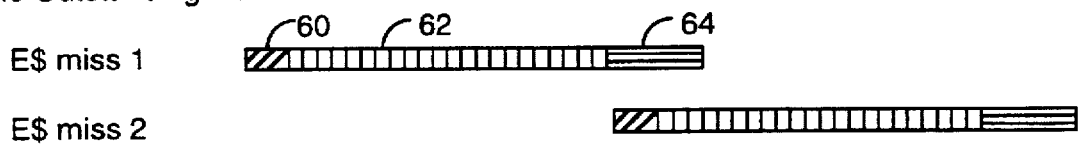
FIG. 6 illustrates the processing improvement stemming from the invention's ability to support multiple outstanding memory reads.
Figure 6:
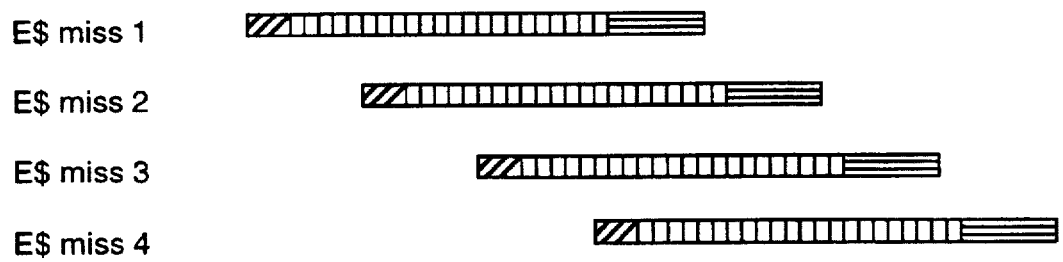

FIG. 6 illustrates the multiple outstanding memory reads that may be accomplished in accordance with the invention. In a system that allows a single outstanding memory read, a first external cache miss operation entails a request to the external cache 60, followed by system memory access 62, followed by the data being available on the central processing unit bus 64. In this system, the second cache miss is not initiated until the system memory access 62 is completed. In the multiple outstanding memory read system of the invention, multiple memory accesses can be performed while the initial memory access is being processed. As shown in FIG. 6, this results in a pipelining of memory accesses.

The computer 20 of the invention operates with a prefetch compiler 70. The prefetch compiler 70 assesses when to use prefetch operations. Static program analysis, information obtained through profile feedback, command line options, and directives embedded in the source code are some methods that may be used to assist the compiler in making prefetch decisions. Prefetch should be used for addresses that miss the external cache, but should not be used for addresses that hit the external cache 34 or internal cache 30.

The compiler 70 must also schedule prefetches sufficiently ahead of the first referencing load instruction to assure that the data is in the external cache 34 when required. This is a function not only of memory latency and loop execution time, but also of the address alignment of the streams being prefetched.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A computer, comprising:

(I) an external memory; and (II) a central processing unit, connected to said external memory, said central processing unit including
   (A) an instruction processing unit to process instructions including a prefetch command,
   (B) an internal cache to selectively generate an internal cache miss signal in response to an address signal received from said instruction processing unit, and
   (C) a First-In-First-Out (FIFO) load buffer connected to said instruction processing unit, said FIFO load buffer configured to generate
      (i) a first access to said external memory in response to said data prefetch command, said first access having an associated data load latency period, and
      (ii) a second access to said external memory, during said data load latency period, in response to said internal cache miss signal such that said first access to said external memory does not stall said second access to said external memory.

2. The apparatus of claim 1 wherein said external memory includes system memory and an external cache, said system memory loading pre-load data into said external cache during said data load latency period.

3. The apparatus of claim 2 wherein said FIFO load buffer is configured to initiate a transfer of said pre-load data from said external cache to an execution unit in response to a subsequent internal cache miss signal.

4. The apparatus of claim 3 wherein said execution unit includes a floating point processing unit.

5. The apparatus of claim i wherein said First-In-First-Out (FIFO) load buffer is configured to generate a second read and a third read to said external memory, during said data load latency period.

6. The apparatus of claim 1 wherein said FIFO load buffer is configured to respond to said internal cache miss signal by loading cache miss data from said external memory into said internal cache.

7. The apparatus of claim 6 wherein said FIFO load buffer is configured to wait for said cache miss data to be loaded from said external memory into said internal cache before processing another address.

8. A computer, comprising:

an external memory; and a central processing unit connected to said external memory, said central processing unit including an instruction processing unit to generate a load address command and a data prefetch command;

a load/store unit connected to said instruction processing unit, said load/store unit including an internal cache to process said load address command and generate an internal cache miss signal, and a First-In-First-Out (FIFO) load buffer to receive said internal cache miss signal and said data prefetch command, said FIFO load buffer processing said internal cache miss signal during an access to said external memory caused by said data prefetch command.

9. The apparatus of claim 8 wherein said FIFO load buffer is configured to generate a plurality of memory reads during said access to said external memory caused by said data prefetch command.

10. The apparatus of claim 8 wherein said FIFO load buffer is configured to respond to said internal cache miss signal by loading cache miss data from said external memory into said internal cache, and wait for said cache miss data to be loaded from said external memory into said internal cache before processing another address.

11. A method of operating a computer, said method comprising the steps of:

routing a data prefetch command to a First-In-First-Out (FIFO) load buffer;

accessing an external cache with said FIFO load buffer in response to said data prefetch command;

loading data from system memory into said external cache in response to said accessing step;

retiring the position of said data prefetch command in said FIFO load buffer before said loading step is completed; and reading said external cache with a new address in said FIFO load buffer before said loading step is completed.

12. The method of claim 11 further comprising the steps of:

generating an internal cache miss signal with an internal cache in response to a load address command;

passing said internal cache miss signal to said FIFO load buffer; and re-accessing, before said loading step is completed, said external cache with said FIFO load buffer in response to said internal cache miss signal, said re-accessing step causing a transfer of data from said external cache into said internal cache.

13. The method of claim 12 further comprising the step of retiring the position of said internal cache miss signal in said FIFO load buffer after said transfer of data from said external cache into said internal cache is completed.

* * * * *

UNITED STATES PATENT AND TRADEMARK OFFICE
CERTIFICATE OF CORRECTION

PATENT NO. : 5,715,425
DATED : February 3, 1998
INVENTOR(S) : Goldman et al.

It is certified that error appears in the above-indentified patent and that said Letters Patent is hereby corrected as shown below:

Column 7, line 41, change "claim i" to --claim 1--.

Signed and Sealed this

Twenty-first Day of April, 1998

Attest:

BRUCE LEHMAN

*Attesting Officer*          *Commissioner of Patents and Trademarks*